(12) United States Patent
Liang et al.

(10) Patent No.: US 9,882,897 B2
(45) Date of Patent: Jan. 30, 2018

(54) METHOD AND SYSTEM FOR TRANSMITTING AND RECEIVING DATA, METHOD AND DEVICE FOR PROCESSING MESSAGE

(71) Applicant: ZTE CORPORATION, Shenzhen, Guangdong Province (CN)

(72) Inventors: Jiehui Liang, Shenzhen (CN); Jiang Zhou, Shenzhen (CN); Ping He, Shenzhen (CN)

(73) Assignee: XI'AN ZHONGXING NEW SOFTWARE CO. LTD., Xi'An (CN)

( * ) Notice: Subject to any disclaimer, the term of this patent is extended or adjusted under 35 U.S.C. 154(b) by 0 days.

(21) Appl. No.: 14/786,958

(22) PCT Filed: Apr. 21, 2014

(86) PCT No.: PCT/CN2014/075849
§ 371 (c)(1),
(2) Date: Oct. 23, 2015

(87) PCT Pub. No.: WO2014/176997
PCT Pub. Date: Nov. 6, 2014

(65) Prior Publication Data
US 2016/0156623 A1    Jun. 2, 2016

(30) Foreign Application Priority Data
Aug. 19, 2013 (CN) .......................... 2013 1 0363458

(51) Int. Cl.
*H04L 9/00* (2006.01)
*H04L 29/06* (2006.01)
(Continued)

(52) U.S. Cl.
CPC ........ *H04L 63/0853* (2013.01); *H04L 9/3226* (2013.01); *H04L 9/3242* (2013.01);
(Continued)

(58) Field of Classification Search
CPC .............................. H04L 61/2589; H04L 9/00
See application file for complete search history.

(56) References Cited

U.S. PATENT DOCUMENTS 8,555,362 B2 * 10/2013 Venkataramani ..... H04L 63/083
709/229
8,769,262 B2 * 7/2014 Nagata ................ H04L 12/4641
709/249
(Continued)

FOREIGN PATENT DOCUMENTS

CN 102638440 A 8/2012
CN 102905258 A 1/2013

OTHER PUBLICATIONS

International Search Report (Form PCT/ISA/210) for PCT/CN2014/075849 dated Jul. 9, 2014.
(Continued)

*Primary Examiner* — Josnel Jeudy
(74) *Attorney, Agent, or Firm* — Koppel, Patrick, Heybl & Philpott

(57) ABSTRACT

The disclosure provides a method and system for transmitting and receiving data, and a method and device for processing message. In the method, a relay server receives an assignment request message from a first User Equipment (UE), wherein the assignment request message is used for obtaining, by the first UE, authorization from the relay server, and the authorization is used for permitting the first UE to transmit and/or receive data via the relay server; the relay server requests a service server to authenticate the first UE according to the assignment request message; in the case that the service server authenticates the first UE successfully, the relay server permits the first UE to transmit and/or receive data via the relay server. According to the technical solution provided by the disclosure, the operation complex-
(Continued)

ity of a user is reduced, and the deployment and application of the relay server is improved greatly.

16 Claims, 4 Drawing Sheets

(51) Int. Cl.
    *H04L 29/12*     (2006.01)
    *H04L 9/32*     (2006.01)
    *H04W 12/06*     (2009.01)
    *H04L 29/08*     (2006.01)

(52) U.S. Cl.
    CPC ...... *H04L 61/2589* (2013.01); *H04L 63/0428* (2013.01); *H04L 63/0807* (2013.01); *H04L 67/02* (2013.01); *H04W 12/06* (2013.01); *H04L 2209/24* (2013.01)

(56) References Cited

U.S. PATENT DOCUMENTS

| | | | |
|---|---|---|---|
| 2007/0264965 A1* | 11/2007 | Taniguchi | H04W 12/02 455/403 |
| 2008/0077789 A1* | 3/2008 | Gondo | H04L 63/08 713/155 |
| 2009/0013381 A1* | 1/2009 | Torvinen | H04L 9/0838 726/3 |
| 2009/0193130 A1 | 7/2009 | Fiatal | |
| 2010/0217990 A1* | 8/2010 | Abe | H04L 45/00 713/176 |
| 2011/0041165 A1* | 2/2011 | Bowen | H04L 63/08 726/5 |
| 2011/0149956 A1 | 6/2011 | Alt et al. | |
| 2011/0271099 A1* | 11/2011 | Preiss | H04L 63/0807 713/155 |
| 2013/0138822 A1* | 5/2013 | Hu | H04L 65/1069 709/227 |

OTHER PUBLICATIONS

Uberti, J. "A REST API for Access to TURN Services," draft-uberti-rtcweb-turn-rest-00.txt, Internet Engineering Task Force, Jul. 8, 2013, pp. 1-7.

Supplementary European Search Report, Application No. EP 14791572, dated Mar. 2, 2016.

* cited by examiner

METHOD AND SYSTEM FOR TRANSMITTING AND RECEIVING DATA, METHOD AND DEVICE FOR PROCESSING MESSAGE

TECHNICAL FIELD

The disclosure relates to the communications field, and in particular to a method and system for transmitting and receiving data, and a method and device for processing message.

BACKGROUND

In the related art, after both two mobile terminals are located in a Network Address Translation (NAT) network, and the NAT network comprises an address (such as an Internet Protocol (IP) address or a port)-related mapping, then the two mobile terminals cannot directly communicate with each other. At this time, a relay server is needed to act as an intermediate node; an Internet Engineering Task Force (IETF) Request for Comments (RFC) 5766 defines a Traversal Using Relays around NAT (TURN) protocol to control interactive operation and data exchange between each one of the two mobile terminals and the relay server. All messages and data are transmitted via the relay server, so the relay server is only used if the direct communication cannot be implemented, and it is only available to an authorized user.

FIG. 1 is a schematic diagram showing a network mode of a relay server according to the related art. As shown in FIG. 1, because of resource limitation of an IPV4 address, an NAT equipment is usually set between a user terminal equipment and the relay server, and limitations of IP addresses and ports usually exist in the NAT equipment, thereby the user terminal equipments cannot directly communicate with each other. In the related art, a service server and the relay server are usually located in a public network, and each of them respectively has its own user information database; if the user terminal equipment wants to use the service server and the relay server, the user terminal equipment must respectively pass authentication performed by the service server and authentication performed by the relay server.

The relay server authenticates the identification of the mobile terminal in an assignment request; if the identification of the mobile terminal is valid, then the mobile terminal is permitted to use the relay server, which is a long-term credential mechanism stated in a Session Traversal Utilities for NAT (STUN) specification, and it requires the mobile terminal to obtain a user name and password from the relay server in advance. For preventing offline dictionary attacks, the required length of the password is usually 128 bits, and they are some randomized characters. Obviously, it will be very difficult for a user to input the password manually. So it is the problem needed to be solved that which way adopted to set the password for the user to access the relay server can be convenient for the user to input while effectively preventing offline dictionary attacks.

Aiming at the problem in the related art that when the user equipment needs to transmit and/or receive data through the relay server, the service server and the relay server are required to authenticate the user equipment respectively, which increases the operation complexity of the user, no effective solution has been presented currently.

SUMMARY

The embodiments of the disclosure provide a method and system for transmitting and receiving data, and a method and device for processing message, so as to at least solve the problem in the related art that when a user equipment needs to transmit and/or receive data through a relay server, a service server and the relay server are required to authenticate the user equipment respectively, which increases the operation complexity of the user.

According to one aspect of the disclosure, a method for transmitting and receiving data is provided.

The method for transmitting and receiving data of the disclosure includes: the relay server receives an assignment request message from a first UE, wherein the assignment request message is used for obtaining, by the first UE, authorization from the relay server, and the authorization is used for permitting the first UE to transmit and/or receive data via the relay server; the relay server requests the service server to authenticate the first UE according to the assignment request message; and in the case that the service server authenticates the first UE successfully, the relay server permits the first UE to transmit and/or receive data via the relay server.

According to another aspect of the disclosure, a system for transmitting and receiving data is provided.

The system for transmitting and receiving data of the disclosure includes: the relay server; the relay server includes: a first receiving component, which is configured to receive the assignment request message from the first UE, wherein the assignment request message is used for obtaining, by the first UE, authorization from the relay server, and the authorization is used for permitting the first UE to transmit and/or receive data via the relay server; an authentication requesting component, which is configured to request the service server to authenticate the first UE according to the assignment request message; and an authorizing component, which is configured to, in the case that the service server authenticates the first UE successfully, permit the first UE to transmit and/or receive data via the relay server.

According to another aspect of the disclosure, a method for processing message is provided.

The method for processing message of the disclosure includes: information of an account which is registered on the service server is added to a assignment request message, and the assignment request message is calculated according to a preset algorithm, wherein the assignment request message is used for obtaining authorization from the relay server, and the authorization is used for transmitting and/or receiving data via the relay server; an account password corresponding to the information of the account is used for encrypting a result of calculation; and the result of encryption is added to the assignment request message, and the assignment request message is sent to the relay server.

According to another aspect of the disclosure, a device for processing message is provided.

The device for processing message of the disclosure includes: a calculating component, which is configured to add the information of the account which is registered on the service server to the assignment request message, and calculate the assignment request message according to a preset algorithm, wherein the assignment request message is used for obtaining authorization from the relay server, and the authorization is used for transmitting and/or receiving data via the relay server; an encrypting component, which is configured to use the account password corresponding to the information of the account to encrypt a result of calculation; and a sending component, which is configured to add the result of encryption to the assignment request message, and send the assignment request message to the relay server.

In embodiments of the disclosure, the relay server is used for receiving the assignment request message from the first UE, wherein the assignment request message is used for obtaining, by the first UE, authorization from the relay server, and the authorization is used for permitting the first UE to transmit and/or receive data via the relay server; the relay server requests the service server to authenticate the first UE according to the assignment request message; in the case that the service server authenticates the first UE successfully, the relay server permits the first UE to transmit and/or receive data via the relay server. That is, the relay server dose not directly authenticate the UE anymore, and does not separately configure authentication information for the user any more, but turns the work of authentication over to the service server, and reuses the authentication information (including: a user account and a password) which is registered on the service server by the user, thus the problem in the related art that when the UE needs to transmit and/or receive data via the relay server, the service server and the relay server are required to authenticate the UE respectively, which increases the operation complexity of the user, is solved, thereby reducing the operation complexity of the user, and improving the deployment and application of the relay server greatly.

BRIEF DESCRIPTION OF THE DRAWINGS

Drawings, provided for further understanding of the disclosure and forming a part of the specification, are used to explain the disclosure together with embodiments of the disclosure rather than to limit the disclosure, wherein.

DETAILED DESCRIPTION OF EMBODIMENTS

The disclosure is described below with reference to the accompanying drawings and embodiments in detail. Note that, the embodiments of the disclosure and the features of the embodiments may be combined with each other if there is no conflict.

Figure 2:
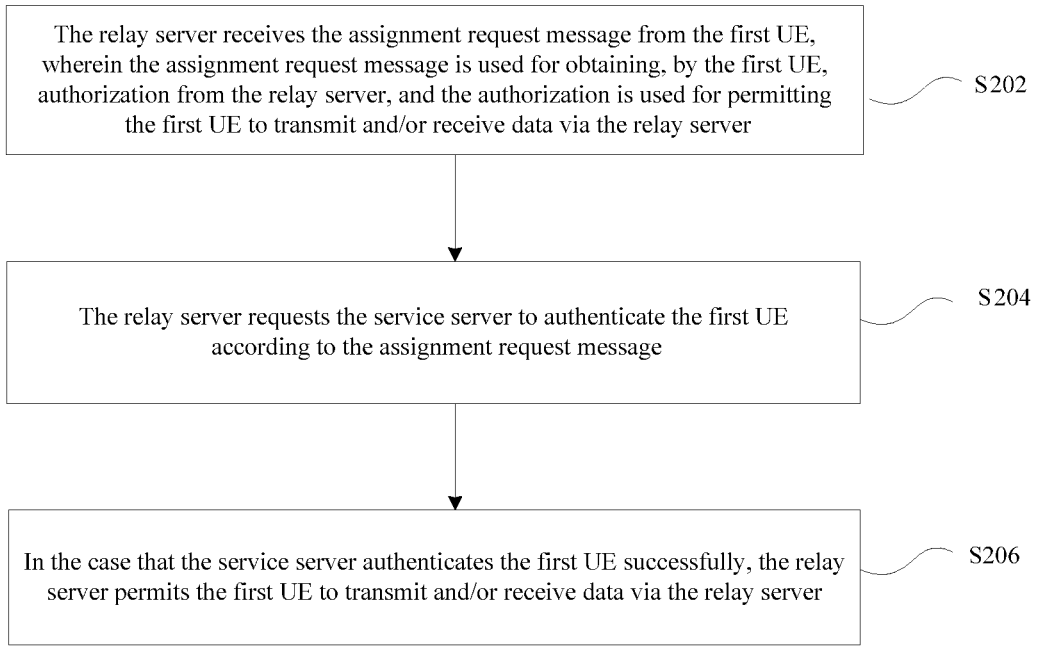
FIG. 2 is a flowchart of a method for transmitting and receiving data according to an embodiment of the disclosure.

FIG. 2 is a flowchart of a method for transmitting and receiving data according to an embodiment of the disclosure. As shown in FIG. 2, the method may include the following processing steps:

Step S202: the relay server receives the assignment request message from the first UE, wherein the assignment request message is used for obtaining, by the first UE, authorization from the relay server, and the authorization is used for permitting the first UE to transmit and/or receive data via the relay server;

Step S204: the relay server requests the service server to authenticate the first UE according to the assignment request message; and Step 206: in the case that the service server authenticates the first UE successfully, the relay server permits the first UE to transmit and/or receive data via the relay server.

In the related art, when the UE needs to transmit and receive data via the relay server, the service server and the relay server are required to authenticate the UE respectively, which increases the operation complexity of the user. By using the method shown in FIG. 2, which includes: the relay server receives the assignment request message from the first UE, wherein the assignment request message is used for obtaining, by the first UE, authorization from the relay server, and transmit and/or receive data via the relay server; the relay server requests the service server to authenticate the first UE according to the assignment request message; in the case that the service server authenticates the first UE successfully, the relay server permits the first UE to transmit and/or receive data via the relay server. That is, the relay server dose not directly authenticate the UE anymore, and does not separately configure authentication information for the user any more, but turns the work of authentication over to the service server, and reuses the authentication information (including: the user account and the password) which is registered on the service server by the user, thus the problem in the related art that when the UE needs to transmit and receive data via the relay server, the service server and the relay server are required to authenticate the UE respectively, which increases the operation complexity of the user, is solved, thereby reducing the operation complexity of the user, and improving the deployment and application of the relay server greatly.

Figure 1:
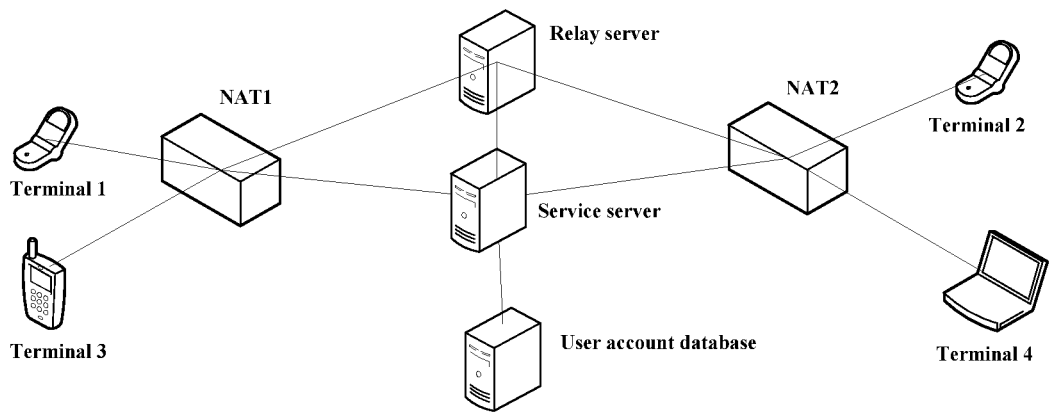
FIG. 1 is a schematic diagram showing a network mode of a relay server according to the related art.

In an example embodiment, if the first UE wants to transmit data to the second UE, and they are located in the different address restricted NAT networks (e.g. a terminal 1 located in a NAT1 network and a terminal 2 in a NAT2 network shown in FIG. 1), and then the service server and the relay server (in the real process of service deployment, the service server and the relay server usually must be configured in pairs) are located in a public network outside the NAT networks. In the real deployment process of the relay server, a Interactive Connectivity Establishment (ICE) negotiation is usually performed in combination with other protocols, so as to detect whether a direct access exists between two UEs to communicate directly. Since the first UE and the second UE cannot communicate directly, a final file transfer negotiation must be transferred through using the relay server. Both the first UE and the second UE respectively have a register account and a register password on the service server, the first UE or the second UE can use a Session Initiation Protocol (SIP) protocol or an Extensible Messaging and Presence Protocol (XMPP) protocol to perform information interaction with the service server, the service server uses an Hyper Text Transport Protocol (HTTP) protocol to perform information interaction with the relay server, and the first UE or the second UE uses a TURN protocol to perform information interaction with the relay server. Since a user authentication mode used by the relay server can reuse the register account and the register password which are stored on the service server, and the service server and the relay server share a user information database to perform unified authentication, the deployment and application of the relay server can be improved greatly, network establishment cost can be reduced, and user experience of using relay server service can be improved.

In an example embodiment, before Step S204, the relay server requests the service server to authenticate the first UE according to the assignment request message, the method further includes the following steps:

Step S1: the relay server judges whether the assignment request message carries message integrity field information;

Step S2: in the case that the relay server determines that the assignment request message does not carry the message integrity field information, the relay server sends an unauthorized response message to the first UE, wherein the unauthorized response message is used for enabling the first UE to resend the assignment request message and carry the message integrity field information in the assignment request message.

In an example embodiment, the UE first logs in through the register account and the register password which are registered on the service server; since the UE cannot communicate directly when initiating a voice communication service, a video communication service or a file data transmission service, the voice communication service, the video communication service or the file data transmission service needs to forward via the relay server. The UE can adopt a key-based Hash Message Authentication Code (HMAC)-Secure Hash Algorithm (SHA1) in the message integrity field information carried in the assignment request message, and the register account of the UE which is on the service server is included in a user name field. After receiving the assignment request message from the first UE, the relay server checks whether a message integrity property field is carried in the assignment request message; if the message integrity property field is not carried in the assignment request message, for authorizing the first UE to access, the relay server sends a 401 response message carrying a random number (NONCE) and a domain name, so as to indicate the first UE to provide valid long-term credential information, wherein the NONCE responded each time is different, which can effectively prevent replay attack. The first UE extracts an NONCE field and a domain name field from the received 401 response message, and adds the NONCE field and the domain name field to the assignment request message; at the same time, the first UE adds information of the account which is registered on the service server to the user name field; then, the first UE performs a Hash calculation to the assignment request message to be reinitiated, and uses the register password corresponding to the register account to encrypt a result of Hash calculation; finally, the first UE adds the result of encryption to the assignment request message as the message integrity field, and initiates the assignment request message again.

In an example embodiment, in Step S204, the relay server requesting the service server to authenticate the first UE according to the assignment request message may include the following steps:

Step S3: the relay server validates the assignment request message;

Step S4: in the case that the relay server validates the assignment request message successfully, the relay server encapsulates the assignment request message as a message body of the HTTP protocol in the authentication request message and sends the authentication request message to the service server.

In an example embodiment, after receiving the assignment request message carrying the message integrity field, the relay server validates a NONCE field and a domain name field; if the NONCE field and the domain name field are valid, the relay server sends, via an HTTP POST request, the assignment request message as the message body of the HTTP protocol to the service server.

In an example embodiment, before Step 206, the relay server permits the first UE to transfer data via the relay server, the method further includes the following steps:

Step S5: the service server receives the authentication request message from the relay Server;

Step S6: the service server performs Hash calculation to other field information except the message integrity field information in the authentication request message, and uses the register password, which is obtained from a preset storage region and corresponds to the first UE, to encrypt a result of the Hash calculation;

Step S7: the service server compares the result of encryption with the message integrity field information, and if the result of encryption is consistent with the message integrity field information, the service server sends an authentication success response message to the relay server.

In an example embodiment, after receiving the POST request, the service server queries, through a user name field in the assignment request message, the corresponding register password in a user information database, performs SHA1 calculation to other field information except the message integrity field information, then uses the register password to encrypt an result of HASH to obtain a result of HMAC-SHA1 calculation, and finally compares the result of the HMAC-SHA1 calculation with the message integrity field information in the assignment request message. If the result of the HMAC-SHA1 calculation is consistent with the message integrity field information, then a user can be determined as a valid user, and the user is currently logged in; the service server notifies, through a 200 OK response, the relay server that the service server can process the assignment request message; if the user cannot be found or the user is not logged in or the result of the HMAC-SHA1 calculation is not consistent with the message integrity field information, the service server notifies, through a 403 response, the relay server that the service server has no need to process the assignment request message.

In an example embodiment, the relay server permits the first UE to transfer data through the relay server may include the following steps:

Step S8: the relay server receives the authentication success response message from the service server;

Step S9: the relay server assigns IP address information, port information, a valid lifecycle of the IP address information and a valid lifecycle of the port information, which are used by the first UE on the relay server, to the first UE according to the authentication success response message, wherein all of the IP address information, the port information, the valid lifecycle of the IP address information and the valid lifecycle of the port information are used for transmitting and/or receiving data, by the first UE, through the relay server.

In an example embodiment, the relay server sends an assignment response message to the first UE according to a result of the service server authenticating the first UE successfully; the assignment response message carries the IP address information, the port information, the valid lifecycle of the IP address information and the valid lifecycle of the port information which are prepared for relay, wherein the valid lifecycle of the IP address information is valid time of the IP address information and the valid lifecycle of the port information is valid time of the port information.

In an example embodiment, before Step S202, the relay server receives the assignment request message from the first UE, the method further includes the following steps:

Step S10: the service server determines that login authentication of the first UE and login authentication of the second UE are successful, wherein the first UE and the second UE are located in the different NAT networks respectively;

Step S11: the service server receives a session request message from the first UE, and forwards the session request message to the second UE, wherein the session request message is used for establishing a session between the first UE and the second UE;

Step S12: the service server receives a session acceptance message from the second UE, and forwards the session acceptance message to the first UE, wherein the session acceptance message is used for enabling the first UE to initiate the assignment request message.

In an example embodiment, the first UE uses the register account and the register password to initiate a login request to the service server, and the service server verifies, through the user information database, the register account and the register password submitted by the user; if the user is valid, then the first UE is permitted to log into the service server. Similarly, the second UE uses the register account and the register password to initiate a login request to the service server, and the service server verifies, through the user information database, the register account and the register password submitted by the user; if the user is valid, then the second UE is permitted to log into the service server. After the first UE finds that the second UE is online, it uses the JINGLE protocol to initiate the session request message to the service server. After receiving the session request message from the first UE, the service server forwards the session request message to a target equipment, namely the second UE. At the same time, the service server sends an acknowledgement message to the first UE to show that the service server has received the session request message and is waiting for the second UE to process. After receiving the session acceptance message from the second UE, the service server forwards the session acceptance message to the first UE.

In an example embodiment, after Step S206, the relay server permits the first UE to transmit and/or receive data through the relay server, the method further includes the following steps:

Steps S13: the service server receives a session termination message from the first UE, wherein the session termination message carries indication information indicating that the first UE has transmitted and/or received all data successfully;

Step S14: after forwarding the session termination message to the second UE, the service server terminates transmitting and/or receiving of data performed by the first UE, wherein the first UE and the second UE are located in the different NAT networks respectively.

In an example embodiment, after completing transmitting and/or receiving of data, the first UE sends the session termination message to the service server, and indicates the successful completion of data transmission in the session termination message. The service server forwards the session termination message to the second UE to end above data transmission process.

Figure 3:
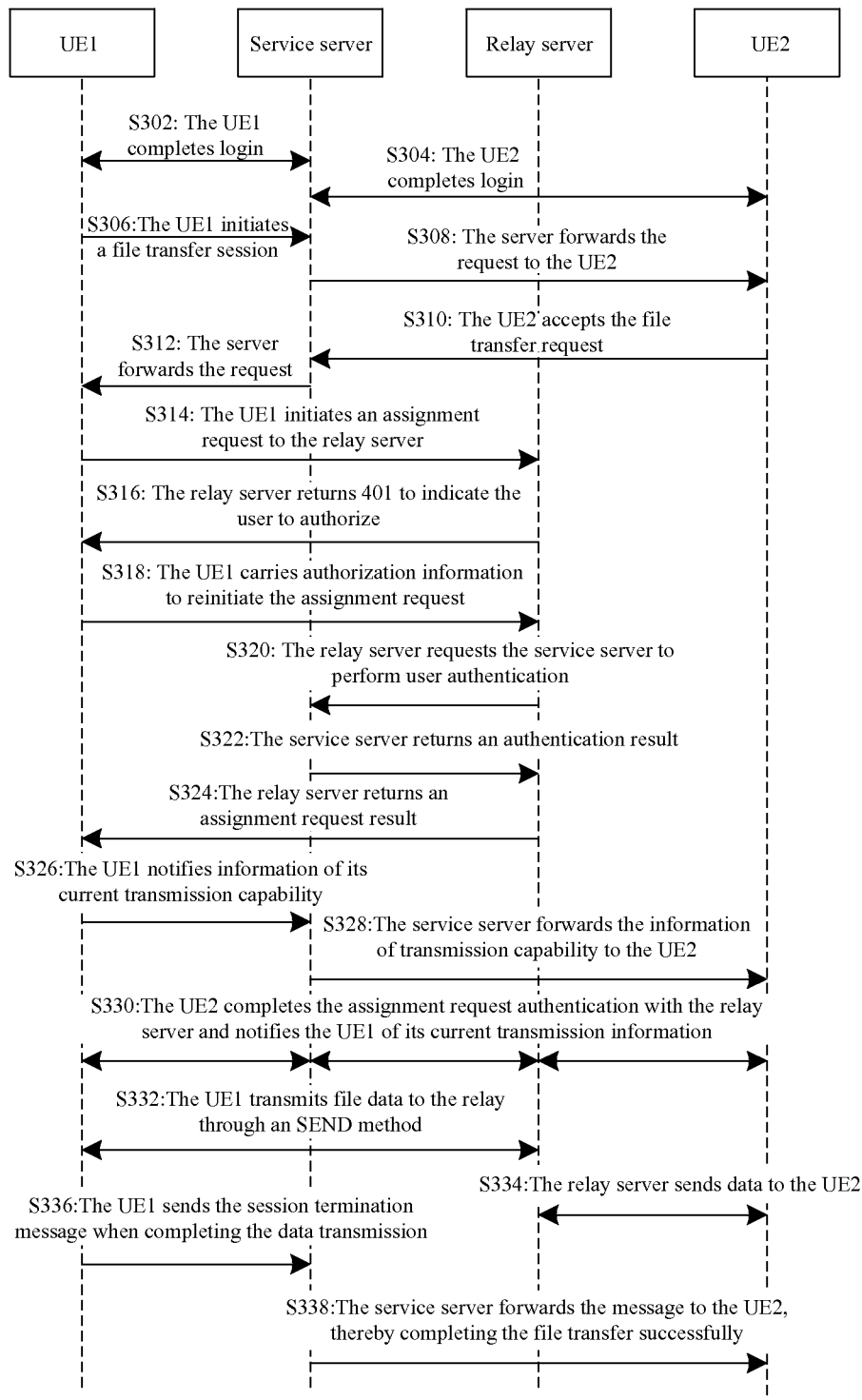
FIG. 3 is a flowchart of a process of transferring files via the relay server according to an example embodiment of the disclosure.

An example implementation process is further described in combination with the preferred implementation mode shown in FIG. 3.

FIG. 3 is a flowchart of a process of transferring files via the relay server according to an example embodiment of the disclosure. As shown in FIG. 3, the first UE (UE1) wants to send a file to the second UE (UE2), both of the UE1 and the UE2 are located in the address restricted NAT networks, and the service server and the relay server are located in a public network outside the NAT network. Since the UE1 and the UE2 cannot communicate directly, final file transfer negotiation must use the relay server to transfer. Each of the UE1 and the UE2 respectively has a register account and a register password on the service server, the UE1 or the UE2 can use the SIP protocol or the XMPP protocol to perform information interaction with the service server, the service server uses the HTTP protocol to perform information interaction with the relay server, and the UE1 or the UE2 uses the TURN protocol to perform information interaction with the relay server. In this example embodiment, for describing conveniently, it is assumed that the XMPP protocol is used as communication protocol between the UE1 and the service server, or between the UE2 and the service server. The flow may include the following processing steps.

Step S302: The UE1 uses the register account of the UE1 and the register password of the UE1 to initiate a login request to the service server, and the service server verifies, through the user information database, the register account of the UE1 and the register password of the UE1 submitted by the user; if the user is valid, then the UE1 is permitted to log into the service server; if there are other equipments logging into the service server, and other equipments are friends of login account of the UE1, then the friends are notified of current online of the UE1.

Step S304: The UE2 uses the register account of the UE2 and the register password of the UE2 to initiate a login request to the service server, and the service server verifies, through the user information database, the register account of the UE2 and the register password of the UE2 submitted by the user; if the UE1 and the UE2 use the same account, then the UE2 can receive information that the UE1 is online; or else, the UE2 can see the information that the UE1 is online only if the UE2 adds the register account of the UE1 as a friend.

Step S306: After finding that the UE2 is online, the UE1 uses the JINGLE protocol to initiate the session request message to the service server, wherein the session request message can include: information of transmission capabilities supported by the UE1 and information of files to be transmitted.

Step S308: After receiving the session request message of the UE1, the service server forwards the session request message to the target equipment, namely the UE2; at the same time, the service server sends the acknowledgement message to the UE1 to show that the service server has received the session request message and is waiting for the UE2 to process.

Step S310: After receiving the session request message forwarded by the service server, if the UE2 does not want to accept the session, then the UE2 sends the session termination message to the service server to notify the service server that the UE2 refuses to process the session request message, and whole session flow is ended; or else, the UE2 sends the session acceptance message to the service server, and the subsequent flow carries on; the session acceptance message can include: information of the transmission capability supported by the UE2; in this example embodiment, the UE2 sends the session acceptance message to the service server.

Step S312: After receiving the session acceptance message, the service server forwards the session acceptance message to the UE1.

Step S314: After receiving the session acceptance message sent by the UE2, the UE1 starts to detect network connectivity; firstly, the UE1 directly sends detection to an IP address of the UE2; secondly, the UE1 sends detection to STUN of the UE2; finally, the UE1 sends detection to TURN of the UE2. Since it has been assumed that both the UE1 and the UE2 are located in the address restricted NAT networks, the first two network connectivity detections cannot succeed; the UE1 and the UE2 cannot directly perform data transmission, but need the relay server; the UE1 initiates the assignment request message to the relay server for requesting the relay server to assign a port for relay transmission; the assignment request message can include: transmission information of the UE1 (including: the IP address, the port and the transmission protocol); the IP address and the port of the relay server are preconfigured in the UE1 and the UE2. Unlike technical specifications adopted in the related are, there is no need to configure a account and a password of the relay server in the UE1 and the UE2.

Step S316: After receiving the assignment request message from the UE1, the relay server checks whether the message integrity property field is carried in the assignment request message; if not, for authorizing the UE1 to access, the relay server sends the 401 response message with the NONCE and the domain name, so as to indicate the UE1 to provide valid long-term credential information, wherein the NONCE responded each time is different, which can effectively prevent replay attack.

Step S318: The UE1 extracts the NONCE field and the domain name field from the received 401 response message, and adds the NONCE field and the domain name field to the assignment request message; at the same time, the UE1 adds the information of the account which is registered on the service server to the user name field; then, the UE1 performs the Hash calculation to the assignment request message to be reinitiated, and uses the register password corresponding to the register account to encrypt the result of the Hash calculation; finally, the UE1 adds the result of encryption to the assignment request message as the message integrity field, and initiates the assignment request message again.

Step S320: After receiving the assignment request message carrying the message integrity field, the relay server validates the NONCE field and the domain name field; if the NONCE field and the domain name field are valid, the relay server takes the assignment request message as the message body of the HTTP protocol, and sends a user authentication request message to the service server.

Step S322: After receiving the user authentication request message from the relay server, the service server performs the Hash calculation to the message body except the message integrity field, and obtains the password corresponding to the user from the user information database to encrypt; if the obtained result of encryption is consistent with content of the message integrity field, then the service server determines that the user is valid, and sends the 200 OK response to the relay server; or else, the user authentication is failed, the relay server can refuse the assignment request message reinitiated last time, and the service server sends the 403 response to the relay server.

Step S324: The relay server sends the assignment response message to the UE1 according to a result of authentication of the service server; if the user is authenticated successfully, then the assignment response message carries the IP address information, the port information, the valid lifecycle of the IP address information and the valid lifecycle of the port information which are prepared for relay, wherein the valid lifecycle of the IP address information is valid time of the IP address information and the valid lifecycle of the port information is valid time of the port information, and the valid time of the IP address information or the valid time of the port information is usually set as 900 seconds.

Step S326: After receiving the assignment success response message, the UE1 sends a notification message to the service server, so as to notify information of relay transmission capability of the UE1, and show that the UE1 is ready to start relay transmission.

Step S328: After receiving the information of the relay transmission capability from the UE1, the service server forwards the relay transmission capability to the UE2, and sends the acknowledge message to the UE1 to show that the service server has forwarded this information.

Step S330: The UE2 repeats the process from Step S316 to Step S328 as well, completes an assignment request authentication with the relay server, obtains an IP address and a port of a relay server corresponding to the UE2, and notifies the UE1 of the information of the current transmission capability of the UE2.

Step S332: Thus, the UE1 can start to transmit data to the IP address and the port assigned by the relay server, or to receive data from the IP address and the port assigned by the relay server.

Step S334: The UE2 can also transmit and/or receive data through the IP address and the port assigned by the relay server.

Step S336: After completing the transmission of file data, the UE1 sends the session termination message to the service server, and indicates the successful completion of data transmission in the session termination message.

Step S338: The service server forwards the session termination message to the UE2 to end the file transmission process.

In this example embodiment, while completing register, the service server authorizes the user to use the relay server when running services provided by the service server. The service server can authorize, according to a login status of the user, whether the UE can use the relay server, so as to control the traffic on the server better. The technical solution provided by the example embodiment can effectively improve the user experience when the user performs intranet traversal, and reduce the network construction cost.

Figure 4:
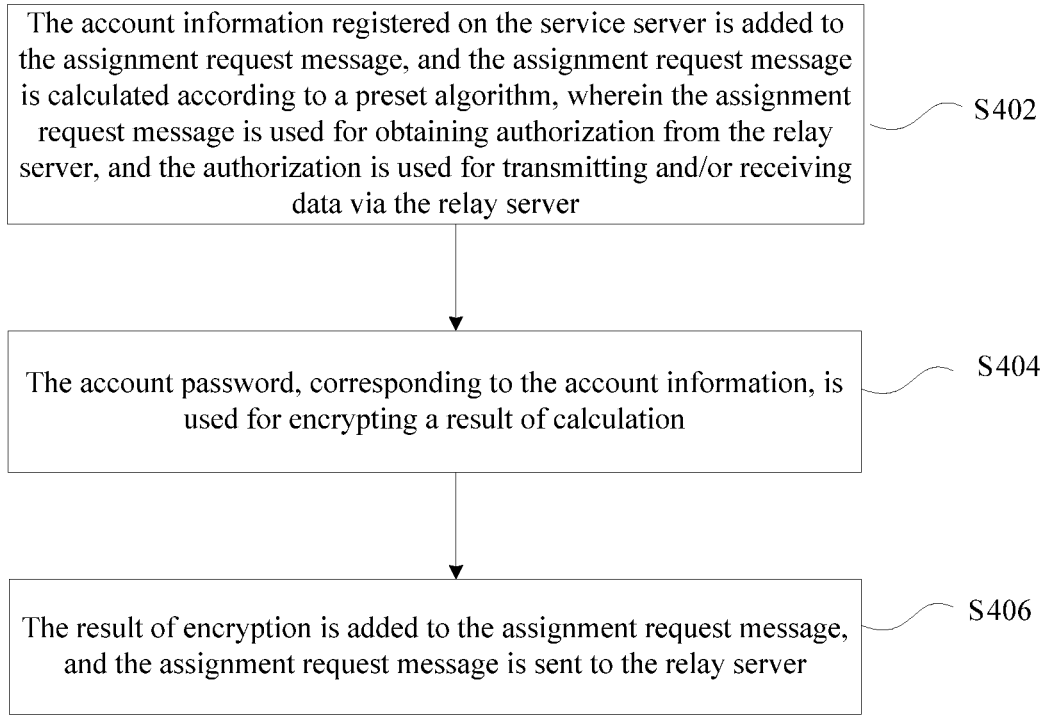
FIG. 4 is a flowchart of a method for processing message according to an embodiment of the disclosure.

FIG. 4 is a flowchart of a method for processing message according to an embodiment of the disclosure. As shown in FIG. 4, the method may include the following processing steps:

Step S402: the account information registered on the service server is added to the assignment request message, and the assignment request message is calculated according to a preset algorithm, wherein the assignment request message is used for obtaining authorization from the relay server, and the authorization is used for transmitting and/or receiving data via the relay server;

Step 404: the account password, corresponding to the account information, is used for encrypting a result of calculation; and Step 406: the result of encryption is added to the assignment request message, and the assignment request message is sent to the relay server.

In the related art, when the UE needs to transfer, via the relay server, data to another UE which is located in the different NAT network, the relay server and the service server need to authenticate twice according to the register account and the register password which are respectively configured for the UE by the service server and the relay server, which increases the operation complexity of the user. Adopting the technical solution provided in the above embodiment does not need to configure the register account and the register password, by the relay server, for the UE anymore, but the relay server and the service server reuse a set of register account and register password, thereby simplifying the operation of authenticating the UE.

Figure 5:
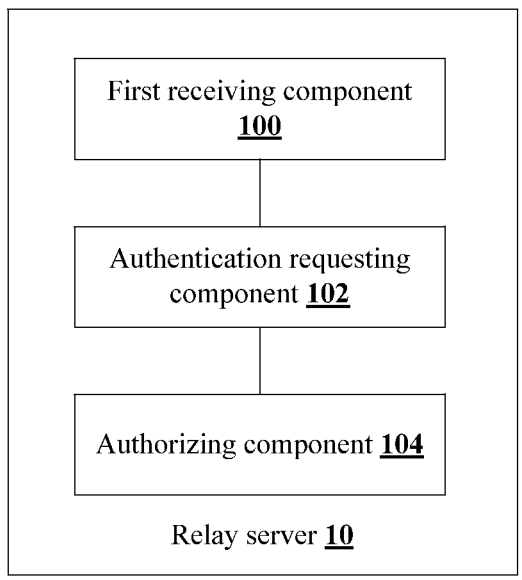
FIG. 5 is a structural diagram of a system for transmitting and receiving data according to an embodiment of the disclosure.

FIG. 5 is a structural diagram of a system for transmitting and receiving data according to an embodiment of the disclosure. As shown in FIG. 5, the system for transmitting and receiving data can include: a relay server 10; the relay server 10 can include: a first receiving component 100, which is configured to receive the assignment request message from the first UE, wherein the assignment request message is used for obtaining, by the first UE, authorization from the relay server, and the authorization is used for permitting the first UE to transmit and/or receive data via the relay server; an authentication requesting component 102, which is configured to request the service server to authenticate the first UE according to the assignment request message; and an authorizing component 104, which is configured to, in the case that the service server authenticates the first UE successfully, permit the first UE to transmit and/or receive data via the relay server.

Using the system shown in FIG. 5 solves the problem in the related art that when the UE needs to transmit and receive data via the relay server, the service server and the relay server are required to authenticate the UE respectively, which increases the operation complexity of the user, thereby reducing the operation complexity of the user, and improving the deployment and application of the relay server greatly.

Figure 6:
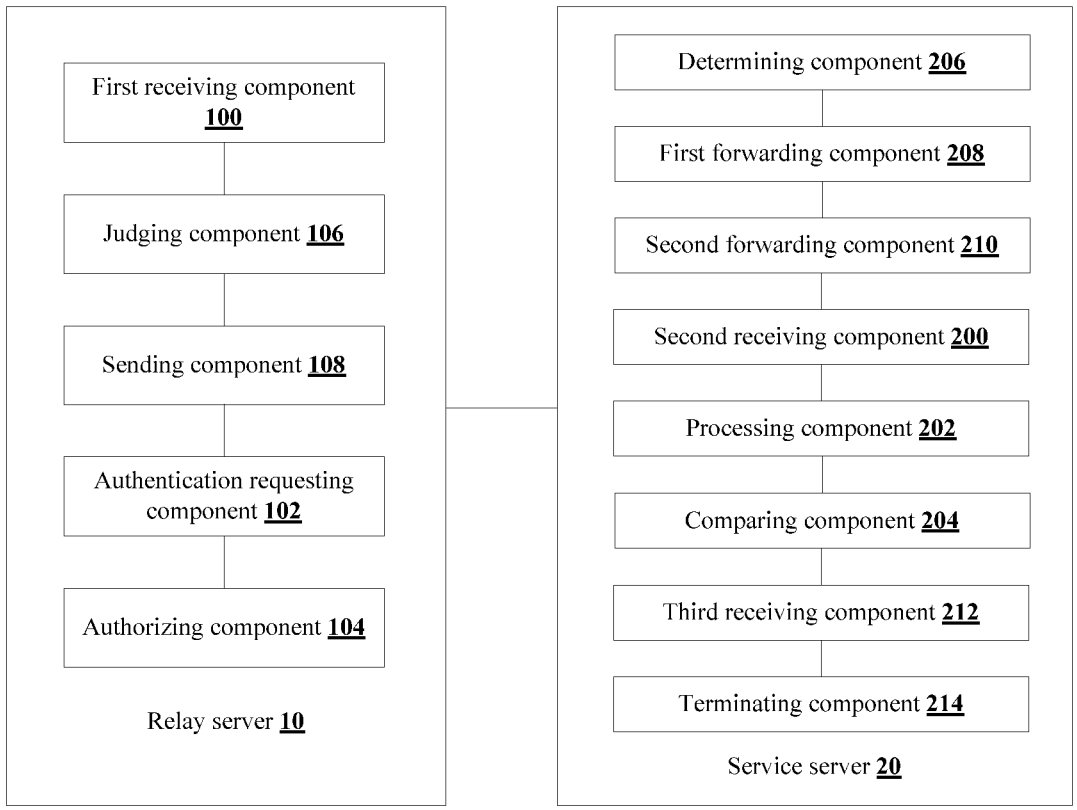
FIG. 6 is a structural diagram of a system for transmitting and receiving data according to an example embodiment of the disclosure.

In an example embodiment, as shown in FIG. 6, the relay server 10 can also include: a judging component 106, which is configured to judge whether the assignment request message carries the message integrity field information; and a sending component 108, which is configured to, when the assignment request message does not carry message integrity field information, send an unauthorized response message to the first UE, wherein the unauthorized response message is used for enabling the first UE to resend the assignment request message and carry the message integrity field information in the assignment request message resent.

In an example embodiment, the authentication requesting component 102 can include: a validating element (not shown in the accompany drawings), which is configured to validate the assignment request message; and a processing element (not shown in the accompany drawings), which is configured to, in the case that the assignment request message is validated successfully, encapsulate the assignment request message as the message body of the HTTP protocol in the authentication request message, and send the authentication request message to the service server.

In an example embodiment, as shown in FIG. 6, the system can also include: a service server 20; the service server 20 can include: a second receiving component 200, which is configured to receive the authentication request message from the relay server; a processing component 202, which is configured to perform the Hash calculation to other field information except the message integrity field information in the authentication request message, and use the register password which is obtained from the preset storage region and corresponds to the first UE to encrypt a result of the Hash calculation; and a comparing component 204, which is configured to compare the result of encryption with the message integrity field information, and when the result of encryption is consistent with the message integrity field information, send the authentication success response message to the relay server.

In an example embodiment, the authorizing component 104 can include: a receiving element (not shown in the accompany drawings), which is configured to receive the authentication success response message from the service server; and an assigning element (not shown in the accompany drawings), which is configured to assign the IP address information, the port information a valid lifecycle of the IP address information and a valid lifecycle of the port information, which are used by the first UE on the relay server, to the first UE according to the authentication success response message, wherein all of the IP address information, the port information, the valid lifecycle of the IP address information and the valid lifecycle of the port information are used for transmitting and/or receiving data, by the first UE, through the relay server.

In an example embodiment, as shown in FIG. 6, the service server 20 can also include: a determining component 206, which is configured to determine that login authentication of the first UE and login authentication of the second UE are successful, wherein the first UE and the second UE are located in the different NAT networks respectively; a first forwarding component 208, which is configured to receive the session request message from the first UE, and forward the session request message to the second UE, wherein the session request message is used for establishing a session between the first UE and the second UE; and a second forwarding component 210, which is configured to receive the session acceptance message from the second UE, and forward the session acceptance message to the first UE, wherein the session acceptance message is used for enabling the first UE to initiate the assignment request message.

In an example embodiment, as shown in FIG. 6, the service server 20 can also include: a third receiving component 212, which is configured to receive the session termination message from the first UE, wherein the session termination message carries the indication information indicating that the first UE has transmitted and/or received all data successfully; and a terminating component 214, which is configured to, after the session termination message is forwarded to the second UE, terminate transmitting and/or receiving of data performed by the first UE, wherein the first UE and the second UE are located in the different NAT networks respectively.

Figure 7:
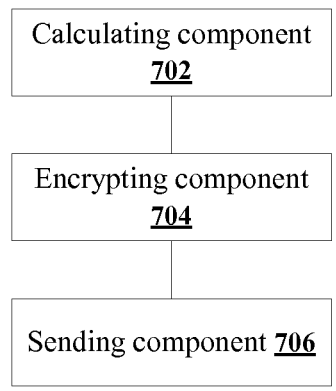
FIG. 7 is a structural diagram of a device for processing message according to an example embodiment of the disclosure.

FIG. 7 is a structural diagram of a device for processing message according to an example embodiment of the disclosure. As shown in FIG. 7, the device for processing message can include: a calculating component 702, which is configured to add the information of the account which is registered on the service server to the assignment request message, and calculate the assignment request message according to the preset algorithm, wherein the assignment request message is used for obtaining authorization from the relay server, and the authorization is used for transmitting and/or receiving data via the relay server; an encrypting component 704, which is configured to use the account password corresponding to the information of the account to encrypt a result of calculation; and a sending component 706, which is configured to add the result of encryption to the assignment request message, and send the assignment request message to the relay server.

It can be seen from the above description that the embodiments achieve the following technical effects (note that, these effects can be achieved by some example embodiments): adopting the technical solutions provided by the embodiments of the disclosure can effectively solve the problem in the related art that when the UE needs to transmit and receive data via the relay server, the service server and the relay server are required to authenticate the UE respectively, which increases the operation complexity of the user, thereby reducing the operation complexity of the user, and improving the deployment and application of the relay server greatly.

Obviously, those skilled in the art should know that each of the mentioned components or steps of the disclosure may be realized by universal computing devices; the modules or steps may be focused on single computing device, or distributed on the network formed by multiple computing devices; selectively, they may be realized by the program codes which may be executed by the computing device; thereby, the modules or steps may be stored in the storage device and executed by the computing device; and under some circumstances, the shown or described steps may be executed in different orders, or may be independently manufactured as each integrated circuit module, or multiple modules or steps thereof may be manufactured to be single integrated circuit module, thus to be realized. In this way, the disclosure is not restricted to any particular hardware and software combination.

The descriptions above are only the preferable embodiment of the disclosure, which are not used to restrict the disclosure, for those skilled in the art, the disclosure may have various changes and variations. Any amendments, equivalent substitutions, improvements, etc. within the principle of the disclosure are all included in the scope of the protection of the disclosure.

INDUSTRIAL APPLICABILITY

As the description above, a method and system for transmitting and receiving data, and a method and device for processing message provided by the disclosure have the following beneficial effects: the problem in the related art that when the UE needs to transmit and receive data via the relay server, the service server and the relay server are required to authenticate the UE respectively, which increases the operation complexity of the user, is solved, thereby reducing the operation complexity of the user, and improving the deployment and application of the relay server.

What is claimed is:

1. A method for transmitting and receiving data, comprising:
receiving, by a relay server, an assignment request message from a first User Equipment, UE, wherein the assignment request message is used for obtaining, by the first UE, authorization from the relay server, and the authorization is used for permitting the first UE to transmit and/or receive data via the relay server;
requesting, by the relay server, a service server to authenticate the first UE according to the assignment request message; and
in the case that the service server authenticates the first UE successfully, permitting, by the relay server, the first UE to transmit and/or receive data via the relay server;
wherein before the first UE sending the assignment request message to the relay server, the method further comprises:
adding information of an account which is registered on the service server to an assignment request message, and calculating the assignment request message according to a preset algorithm;
using an account password corresponding to the information of the account to encrypt a result of calculation; and
adding the result of encryption to the assignment request message, and sending the assignment request message to the relay server.

2. The method according to claim 1, wherein before the relay server requests the service server to authenticate the first UE according to the assignment request message, the method further comprises:
judging, by the relay server, whether the assignment request message carries message integrity field information; and
in the case that the relay server determines that the assignment request message does not carry the message integrity field information, sending, by the relay server, an unauthorized response message to the first UE, wherein the unauthorized response message is used for enabling the first UE to resend the assignment request message and carry the message integrity field information in the assignment request message resent.

3. The method according to claim 2, wherein the relay server requests the service server to authenticate the first UE according to the assignment request message comprises:
validating, by the relay server, the assignment request message; and
in the case that the relay server validates the assignment request message successfully, encapsulating, by the relay server, the assignment request message as a message body of the Hyper Text Transport Protocol, HTTP, protocol in an authentication request message, and sending, by the relay server, the authentication request message to the service server.

4. The method according to claim 3, wherein before the relay server permits the first UE to transfer data via the relay server, the method further comprises:
receiving, by the service server, the authentication request message from the relay server;
performing, by the service server, a Hash calculation to other field information except the message integrity field information in the authentication request message, and using, by the service server, a register password which is obtained from a preset storage region and corresponds to the first UE to encrypt a result of the Hash calculation; and
comparing, by the service server, a result of encryption with the message integrity field information, and when the result of encryption is consistent with the message integrity field information, sending, by the service server, an authentication success response message to the relay server.

5. The method according to claim 4, wherein the relay server permits the first UE to transfer data via the relay server comprises:
receiving, by the relay server, the authentication success response message from the service server; and
assigning, by the relay server, Internet Protocol, IP, address information, port information, a valid lifecycle of the IP address information and a valid lifecycle of the port information, which are used by the first UE on the relay server, to the first UE according to the authentication success response message, wherein all of the IP address information, the port information, the valid lifecycle of the IP address information and the valid lifecycle of the port information are used for transmitting and/or receiving data, by the first UE, via the relay server.

6. The method according to claim 1, wherein before the relay server receives the assignment request message from the first UE, the method further comprises:
   determining, by the service server, that login authentication of the first UE and login authentication of a second UE are successful, wherein the first UE and the second UE are located in different Network Address Translation, NAT, networks respectively;
   receiving, by the service server, a session request message from the first UE, and forwarding, by the service server, the session request message to the second UE, wherein the session request message is used for establishing a session between the first UE and the second UE; and
   receiving, by the service server, a session acceptance message from the second UE, and forwarding, by the service server, the session acceptance message to the first UE, wherein the session acceptance message is used for enabling the first UE to initiate the assignment request message.

7. The method according to claim 1, wherein after the relay server permits the first UE to transmit and/or receive data via the relay server, the method further comprises:
   receiving, by the service server, a session termination message from the first UE, wherein the session termination message carries indication information indicating that the first UE has transmitted and/or received all data successfully; and
   after the service server forwards the session termination message to the second UE, terminating, by the service server, transmitting and/or receiving of data performed by the first UE, wherein the first UE and the second UE are located in the different NAT networks respectively.

8. A system for transmitting and receiving data, comprising: a relay server;
   the relay server comprises a processor and a memory, and the processor is configured to execute program components stored in the memory, and the program components comprise:
   a first receiving component configured to receive an assignment request message from a first User Equipment, UE, wherein the assignment request message is used for obtaining, by the first UE, authorization from the relay server, and the authorization is used for permitting the first UE to transmit and/or receive data via the relay server;
   an authentication requesting component configured to request a service server to authenticate the first UE according to the assignment request message;
   an authorizing component configured to, in the case that the service server authenticates the first UE successfully, permit the first UE to transmit and/or receive data via the relay server;
   a calculating component configured to add information of an account which is registered on the service server to an assignment request message, and calculate the assignment request message according to a preset algorithm;
   an encrypting component configured to use an account password corresponding to the information of the account to encrypt a result of calculation; and
   a sending component configured to add a result of encryption to the assignment request message, and send the assignment request message to the relay server.

9. The system according to claim 8, wherein the relay server further comprises the following program components:
   a judging component configured to judge whether the assignment request message carries message integrity field information; and
   a sending component configured to, when the assignment request message does not carry message integrity field information, send an unauthorized response message to the first UE, wherein the unauthorized response message is used for enabling the first UE to resend the assignment request message and carry the message integrity field information in the assignment request message resent.

10. The system according to claim 9, wherein the authentication requesting component comprises:
    a validating element configured to validate the assignment request message; and
    a processing element configured to, in the case that the assignment request message is validated successfully, encapsulate the assignment request message as a message body of the Hyper Text Transport Protocol, HTTP, protocol in an authentication request message, and send the authentication request message to the service server.

11. The system according to claim 10, wherein the system further comprises: the service server;
    the service server comprises a processor and a memory, and the processor is configured to execute program components stored in the memory, and the program components comprise:
    a second receiving component configured to receive the authentication request message from the relay server;
    a processing component configured to perform a Hash calculation to other field information except the message integrity field information in the authentication request message, and use a register password which is obtained from a preset storage region and corresponds to the first UE to encrypt a result of the Hash calculation; and
    a comparing component configured to compare a result of encryption with the message integrity field information, and when the result of encryption is consistent with the message integrity field information, send an authentication success response message to the relay server.

12. The system according to claim 11, wherein the authorizing component comprises:
    a receiving element configured to receive the authentication success response message from the service server; and
    an assigning element configured to assign Internet Protocol, IP, address information, port information, a valid lifecycle of the IP address information and a valid lifecycle of the port information, which are used by the first UE on the relay server, to the first UE according to the authentication success response message, wherein all of the IP address information, the port information, the valid lifecycle of the IP address information and the valid lifecycle of the port information are used for transmitting and/or receiving data by the first UE via the relay server.

13. The system according to claim 8, wherein the service server further comprises the following program components:
    a determining component configured to determine that login authentication of the first UE and login authentication of a second UE are successful, wherein the first UE and the second UE are located in different Network Address Translation, NAT, networks respectively;

a first forwarding component configured to receive a session request message from the first UE, and forward the session request message to the second UE, wherein the session request message is used for establishing a session between the first UE and the second UE; and a second forwarding component configured to receive a session acceptance message from the second UE, and forward the session acceptance message to the first UE, wherein the session acceptance message is used for enabling the first UE to initiate the assignment request message.

14. The system according to claim 8, wherein the service server further comprises the following program components:

a third receiving component configured to receive a session termination message from the first UE, wherein the session termination message carries indication information indicating that the first UE has transmitted and/or received all data successfully; and a terminating component configured to, after the session termination message is forwarded to the second UE, terminate transmitting and/or receiving of data performed by the first UE, wherein the first UE and the second UE are located in the different NAT networks respectively.

15. The method according to claim 2, wherein before the relay server receives the assignment request message from the first UE, the method further comprises:

determining, by the service server, that login authentication of the first UE and login authentication of a second UE are successful, wherein the first UE and the second UE are located in different Network Address Translation, NAT, networks respectively;

receiving, by the service server, a session request message from the first UE, and forwarding, by the service server, the session request message to the second UE, wherein the session request message is used for establishing a session between the first UE and the second UE; and receiving, by the service server, a session acceptance message from the second UE, and forwarding, by the service server, the session acceptance message to the first UE, wherein the session acceptance message is used for enabling the first UE to initiate the assignment request message.

16. The method according to claim 2, wherein after the relay server permits the first UE to transmit and/or receive data via the relay server, the method further comprises:

receiving, by the service server, a session termination message from the first UE, wherein the session termination message carries indication information indicating that the first UE has transmitted and/or received all data successfully; and after the service server forwards the session termination message to the second UE, terminating, by the service server, transmitting and/or receiving of data performed by the first UE, wherein the first UE and the second UE are located in the different NAT networks respectively.

* * * * *